Aug. 9, 1966        E. D. HARPOLD        3,264,828
DRAINAGE LINE CONSTRUCTION
Filed Oct. 19, 1962
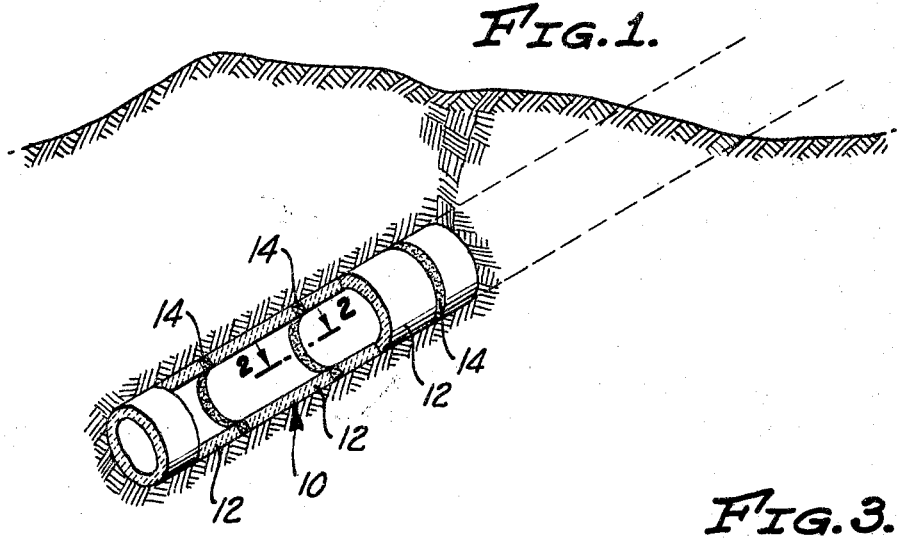
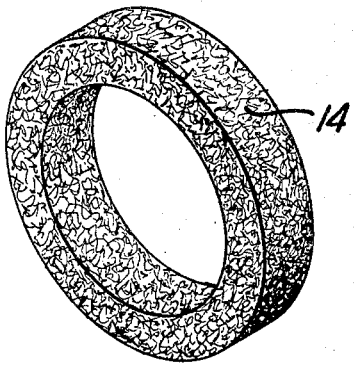
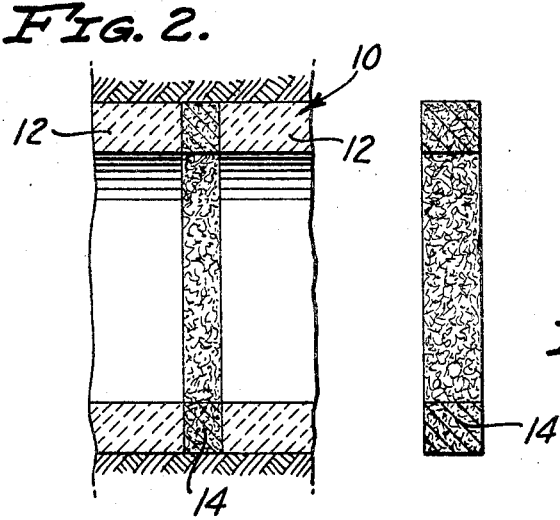
*INVENTOR.*
EDDIE D. HARPOLD
BY HIS ATTORNEYS
HARRIS, KIECH, RUSSELL & KERN

United States Patent Office 3,264,828
Patented August 9, 1966

3,264,828
DRAINAGE LINE CONSTRUCTION
Eddie D. Harpold, Huntington Beach, Calif., assignor to La Bolsa Tile Co., Huntington Beach, Calif., a corporation of California
Filed Oct. 19, 1962, Ser. No. 231,633
1 Claim. (Cl. 61—11)

The present invention relates in general to a sectional conduit having joints which permit fluid flow between the interior and the exterior of the conduit and which incorporate filters for preventing the passage of solids.

Since the invention finds particular utility in subterranean lines for subsurface soil drainage and/or irrigation, it will be considered in such connection herein for purposes of illustration.

Subsurface drainage lines conventionally comprise drainage tiles laid in end-to-end, abutting relation, excess ground water percolating through the joints formed by the abutting tile ends. In order to exclude dirt from the interior of the drainage line while permitting excess ground water to percolate thereinto through the joints between the drainage tiles, a common practice is to lay the drainage line in a filter bed of crushed rock, gravel, or the like, as more fully disclosed in my Patent No. 2,738,745, granted March 20, 1956. Such a filter bed, while effective for its intended purpose, is expensive since it requires a large quantity of filter material, requires the excavation of a trench considerably wider than the diameter of the drainage line, and the like.

With the foregoing as background, a primary object of the invention is to provide a filter means, for preventing the passage of dirt, or other solids, through the joints of a sectional conduit, which is at least as effective as prior filter means for this purpose, but much simpler and much less expensive.

More particularly, a primary object of the invention is to provide a filter means which comprises simply an annular filter gasket of fibrous material disposed between and engaged by the adjacent ends of adjacent conduit sections.

Another and important object is to provide a fibrous filter gasket which is compressible between the adjacent conduit-section ends so as to produce positive contact between the gasket and the conduit-section ends. Such axial compression of the fibrous filter gaskets, which may be varied to vary the permeability of the gaskets, may be produced readily by axially displacing successive conduit sections toward the previously-laid sections as they are laid. For example, an apparatus such as that disclosed in my prior patent may be utilized for the purpose.

Another object is to provide a compressible annular filter gasket formed of a fibrous material which is inert under the conditions to which it is exposed in use so that it will not deteriorate even after prolonged usage.

A further object of the invention is to provide an annular filter gasket formed of felted or matted fibers which are inert with respect to their intended environment and which are capable of being compressed between adjacent conduit-section ends to provide positive engagement with such ends.

I have found that a compressible annular filter gasket formed of matted glass fibers is particularly desirable for use between adjacent sections of a subsurface drainage line, such a filter gasket being extremely effective in preventing the infiltration of dirt into the conduit and being insusceptible to deterioration even after prolonged usage. However, other fibrous materials may also be used, additional examples being nylon, Dacron, rayon and asbestos.

The foregoing objects, advantages, features and results of the present invention, together with various other objects, advantages, features and results thereof which will be evident to those skilled in the art in the light of this disclosure, may be achieved with the exemplary embodiment of the invention described in detail hereinafter and illustrated in the accompanying drawing, in which:

FIG. 1 is a perspective view illustrating a subsurface drainage and/or irrigation line of the invention as installed, part of the ground being broken away to reveal the drainage line;

FIG. 2 is an enlarged fragmentary longitudinal sectional view taken as indicated by the arrowed line 2—2 of FIG. 1;

FIG. 3 is a perspective view of an annular filter gasket of the invention; and

FIG. 4 is a longitudinal sectional view through such gasket.

In the drawing, the numeral 10 designates a subsurface conduit or line which may be utilized either for drainage or irrigation purposes. One end of the conduit is connected to a suitable point of disposal, not shown, for excess water in the event that the conduit 10 is utilized as a drainage line. If it is used as a subsurface irrigation line, one end of the conduit 10 may be connected to a source of irrigation water, not shown.

The conduit 10 comprises simply a series of conduit sections 12, such as ordinary drainage tiles, arranged in end-to-end relation with an annular filter gasket 14 of the invention inserted between the adjacent ends of each pair of adjacent conduit sections. As best shown in FIG. 2 of the drawing, each gasket 14 has substantially the same inside and outside diameters as the conduit sections 12 and is engaged by the adjacent ends of the adjacent conduit sections.

Each gasket 14 is made of a compressible fibrous material and is axially compressed between the adjacent ends of the adjacent conduit sections 12 to secure positive contact between the gasket and the adjacent conduit-section ends so as to insure dirt exclusion from the interior of the conduit 10. Such axial compression of the gaskets 14, the extent of which may be varied to vary permeability to water, may be effected by means of the apparatus disclosed in my aforementioned patent. A comparison of FIGS. 2 and 4 will illustrate the degree to which one of the gaskets 14 may be compressed in the axial direction upon installation.

In order to achieve the foregoing desirable compressibility, the gaskets 14 are preferably made of felted or matted fibers. For example, the gaskets 14 may be cut from a blanket or sheet formed of matted or felted fibers and of appropriate thickness.

Since subsurface conduits of the nature to which the invention relates are intended to be used for prolonged periods of time without repair, it is essential that the filter gaskets 14 be made of a fibrous material which is inert under the conditions to which it is exposed so that it will not deteriorate with the passage of time. I have found that matted glass fibers are excellent for the purpose, being completely inert under the conditions of use outlined, providing sufficient compressibility to achieve positive contact between the gaskets and the conduit sections 12, being extremely effective in preventing the entry of dirt into the conduit 10 while permitting free percolation of water into or out of the conduit, having sufficient strength to prevent inward collapse when compressed between the conduit sections, and the like. However, it will be understood that fibers other than glass fibers may be used.

It will also be apparent that the present invention provides a very simple subsurface installation and one which does not require a voluminous and expensive filter bed and a correspondingly large and expensive trench.

Although exemplary embodiments of the invention have been disclosed herein for purposes of illustration, it will be understood that various changes, modifications and substitutions may be incorporated in such embodiments without departing from the spirit of the invention as defined by the claim which follows.

I claim:

In a sectional underground conduit having joints through which water may percolate between the interior and the exterior of the conduit, the combination of:

(a) conduit sections in spaced end-to-end relation;

(b) compressible annular filter gaskets of inert fibrous material respectively disposed between the adjacent ends of adjacent ones of said conduit sections;

(c) the axial spacings of said adjacent conduit-section ends being less than the initial axial dimensions of said filter gaskets when uncompressed, so that said filter gaskets are axially compressed between said adjacent conduit-section ends;

(d) the degree of axial compression of said filter gaskets being insufficient to prevent percolation of water therethrough; and (e) the inside and outside diameters of said filter gaskets respectively being substantially equal to the inside and outside diameters of said conduit sections, the inner and outer surfaces of said gaskets extending in substantially flush relation to the corresponding surfaces of said conduit sections.

References Cited by the Examiner

UNITED STATES PATENTS

| | | | |
|---|---|---|---|
| 342,659 | 5/1886 | Westinghouse | 285—337 X |
| 764,603 | 7/1904 | Lambert | 285—48 X |
| 927,606 | 7/1909 | Sellenscheidt | 210—351 |
| 968,226 | 8/1910 | Ziller | 61—10 |
| 1,538,669 | 5/1925 | Smith | 61—10 |
| 1,782,412 | 11/1930 | Dietrichs. | |
| 2,798,768 | 7/1957 | Babin | 61—13 X |
| 3,073,735 | 1/1963 | Till et al. | 61—11 X |
| 3,081,599 | 3/1963 | Roberg | 61—11 |
| 3,103,789 | 9/1963 | McDuff et al. | 61—11 |

EARL J. WITMER, *Primary Examiner.*